Figure 1:
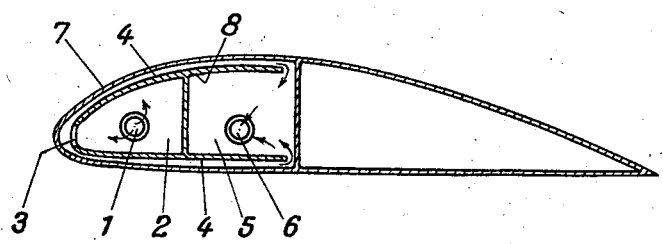

Sept. 16, 1941.   F. KLEIN   2,256,393

COOLING THE CHARGE OF INTERNAL COMBUSTION ENGINES

Filed May 27, 1938

Inventor:
Friedrich Klein,

Patented Sept. 16, 1941

2,256,393

UNITED STATES PATENT OFFICE 2,256,393

COOLING THE CHARGE OF INTERNAL COMBUSTION ENGINES

Friedrich Klein, Dessau, Germany, assignor to Junkers Flugzeug-und-Motorenwerke Aktiengesellschaft, Dessau, Germany Application May 27, 1938, Serial No. 210,367
In Germany July 5, 1937

5 Claims. (Cl. 244—134)

This invention relates to means for cooling the combustible mixture and/or the air of combustion supplied to internal combustion engines connected with vehicles and more especially aircraft.

As is well-known to those skilled in the art, the air of combustion or the mixture of gaseous or liquid fuel with this air, if supplied to the engine by means of a blower or compressor, is heated in consequence of the high compression to such an extent that it has been found necessary to cool it down to a temperature, which is most favorable for operation of the engine.

According to this invention cooling of the highly heated air or gas mixture is effected by causing the air or gas mixture to pass through hollow parts of the vehicle or aircraft, which are exposed to the cooling action of the free air current. For instance a double-walled car roof or the wing of an aeroplane may, according to this invention, serve for cooling the air or mixture.

Preferably the gas supplied by the blower or compressor and heated to a high temperature in consequence of its high compression, before entering the engine cylinders, is caused to pass through structural parts of the vehicle, which, when the vehicle is under way, are cooled by the relative wind. In the case of large structural parts such as for instance the wings or bearing planes of an aeroplane, the front part, which is quite particularly exposed to the cooling action of the relative wind and, if the temperature of the air is low, is frequently covered with ice, is preferably used as a cooler. In that case the heat absorbed by the walls of the wing counteracts the formation of ice.

Preferably the structural part serving as a cooling means is so subdivided by a system of tubes and/or compartments, that the greater part of the heat absorbed from the gaseous heat carrier traversing these tubes and compartments is taken up at those places of the outer wall, for instance the forward portion of the wing, where the cooling effect and the danger of ice formation are particularly great. Preferably the compartments are so arranged as to be capable of withstanding pressure above normal, since in the interior of the cooler a higher pressure prevails.

It has been found particularly advantageous to so arrange the narrow conduits traversed by the heat carrier that they extend throughout that part of the vehicle or aircraft structure which is particularly exposed to ice formation, the gas current being confined on the one hand by the outer surface, for instance the outer wing planking, on the other hand by guide surfaces provided in the interior of the structural member. The parts which form the cooler are preferably so mounted in the vehicle or aircraft structure that this latter forms a closed static system also without these parts and that, for instance in the case of an aircraft wing, the parts forming the cooler do not participate in the static construction of the wing. Therefore the cooler proper may be mounted in place in a manner such that it can readily be removed.

In the drawing affixed to this specification and forming part thereof an embodiment of my invention is illustrated diagrammatically by way of example.

In the drawing

Fig. 1 is a cross-section and

Figure 2:
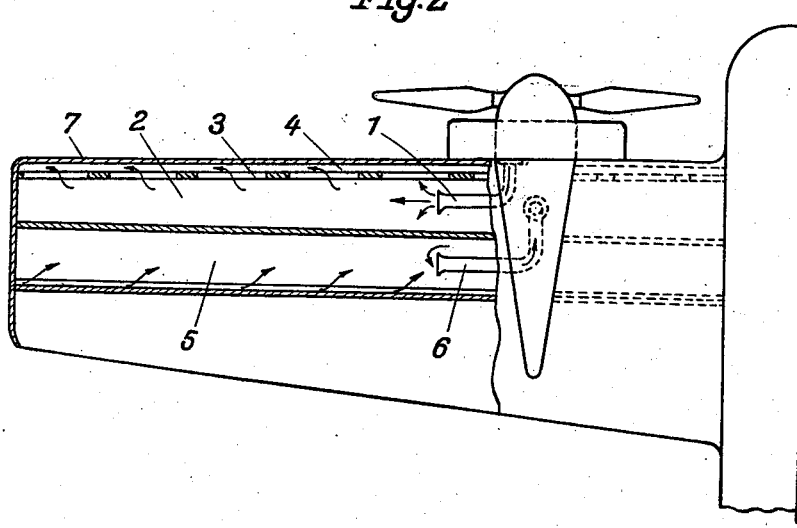

Fig. 2 a plan view, partly in horizontal section, of an airplane wing, the inner structural parts of which are partly omitted for the sake of simplicity.

Referring to the drawing, 1 is a tube serving to lead the fuel, mixture or air of combustion sucked in by the blower or compressor connected with the engine into the distributing compartment 2 extending throughout the length of the wing. From this compartment the gas or gas mixture escapes through comparatively narrow slits 3, situated directly to the rear of the front part of the wing and at a point where the cooling action is the strongest, into narrow conduits 4 formed in a compartment 5 which also extends throughout the length of the wing. After having lost here the part of the heat which is undesirable, it passes through a tube 6 to the engine cylinders.

The narrow apertures 3 and conduits 4 bring about an increased velocity of flow of the hot air or gas as compared with the velocity in the compartment 2 and thereby a particularly quick and efficient transmission of heat onto the points of highest cooling effect is obtained.

The outer covering 7 of the wing at the same time forms the outer shell of the cooler. In view of the pressure above normal in the cooler the compartments are shut off in a pressure-tight manner from the outer air.

In order to protect certain zones of the structural part forming the cooler against heating, single conduits or guide walls and more especially those located at the rear in the direction of travel may be heat-insulated. In that case also an increased transmission of heat to the front zones is brought about.

Various changes may be made in the details disclosed in the foregoing specification without departing from the invention or sacrificing the advantages thereof.

I claim:

1. An arrangement of the character described comprising a hollow member mounted upon a vehicle facing its normal direction of travel, means forming two compartments one behind the other in said member, a wall of the front compartment being spaced from said member and extending parallel with and adjacent the leading side of the latter whereby a conduit is formed within the member and around said front compartment, an inlet into the latter for the passage of heated gases thereinto, the front wall of said front compartment being apertured for the passage of said gases towards said leading side into said conduit, the latter terminating in said other compartment, and means in said other compartment forming an outlet therefrom for said gases.

2. In combination with an airplane wing having a hollow forward portion, a partition extending longitudinally within the wing and forming with the wing surface a closed chamber, a closed walled compartment of substantially less cross-sectional area than said chamber extending longitudinally therein, means positioning said compartment in such manner that the walls thereof are in spaced relation to the wall of the chamber, the forward wall of said compartment being closely adjacent to the forward wall of the chamber to thereby form a relatively narrow passage as compared with the cross-sectional area of the compartment, spaced openings in the forward wall of the compartment, an inlet opening in the compartment, and an outlet opening in the chamber.

3. In combination with an airplane wing having a hollow forward portion, a partition extending longitudinally within the wing and forming with the wing surface a closed chamber, a closed walled compartment extending longitudinally within said chamber, one wall thereof being contoured in substantial conformity with the contour of the wing portion constituting a wall of said chamber, means positioning the compartment in such manner that the walls thereof are in spaced relation to the wall of said chamber, the contoured wall of the compartment being closely adjacent to the chamber wall forming portion of the wing and substantially coextensive therewith to thereby form a relatively narrow passage as compared with the cross-sectional area of the compartment, spaced openings in the contoured wall of the compartment adjacent the leading edge of the wing, an inlet opening in the compartment, and an outlet opening in the chamber.

4. In an aircraft having a hollow forward wing structure, a combustion engine, a fuel mixer, and a fluid compressor associated therewith, the combination of a partition extending longitudinally within the wing and forming with the wing surface a closed chamber, a closed walled compartment of substantially less cross-sectional area than said chamber extending longitudinally therein, means positioning said compartment in such manner that the walls thereof are in spaced relation to the wall of the chamber, the forward wall of said compartment being closely adjacent to the forward wall of the chamber to thereby form a relatively narrow passage as compared with the cross-sectional area of the compartment, spaced openings in the forward wall of the compartment, an inlet opening in the compartment communicating with the compressor, and an outlet opening in the chamber communicating with the engine.

5. In an aircraft having a hollow forward wing structure, a combustion engine, a fuel mixer, and a fluid compressor associated therewith, the combination of a partition extending longitudinally within the wing and forming with the wing surface a closed chamber, a closed walled compartment extending longitudinally within said chamber, one wall thereof being contoured in substantial conformity with the contour of the wing portion constituting a wall of said chamber, means positioning the compartment in such manner that the walls thereof are in spaced relation to the wall of said chamber, the contoured wall of the compartment being closely adjacent to the chamber wall forming portion of the wing and substantially coextensive therewith to thereby form a relatively narrow passage as compared with the cross-sectional area of the compartment, spaced openings in the contoured wall of the compartment adjacent the leading edge of the wing, an inlet opening in the compartment communicating with the compressor, and an outlet opening in the chamber communicating with the engine.

FRIEDRICH KLEIN.